Oct. 20, 1925.

S. J. BORCHARDT

LENS

Filed Jan. 12, 1925

1,557,553

S. J. Borchardt
INVENTOR

BY Victor J. Evans
ATTORNEY

Patented Oct. 20, 1925.

1,557,553

UNITED STATES PATENT OFFICE.

STEVE J. BORCHARDT, OF STEVENS POINT, WISCONSIN.

LENS.

Application filed January 12, 1925. Serial No. 1,978.

*To all whom it may concern:*

Be it known that I, STEVE J. BORCHARDT, a citizen of the United States, residing at Stevens Point, in the county of Portage and State of Wisconsin, have invented new and useful Improvements in Lenses, of which the following is a specification.

This invention contemplates the provision of a lens for automobile headlamps, the lens being designed to prevent the light rays from being projected into the eyes of drivers of approaching vehicles, with a view of minimizing accidents which are the direct result of the blinding effect of the headlights.

More specifically stated, the invention contemplates the provision of a lens, from the opposite sides of which project spaced parallel plates, which are colored or otherwise treated to render them translucent and which plates are so arranged as to direct the light rays in parallel lines through the lens, thus confining the rays within a limited area, so that they cannot interfere with drivers of approaching vehicles.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein.

Figure 1:
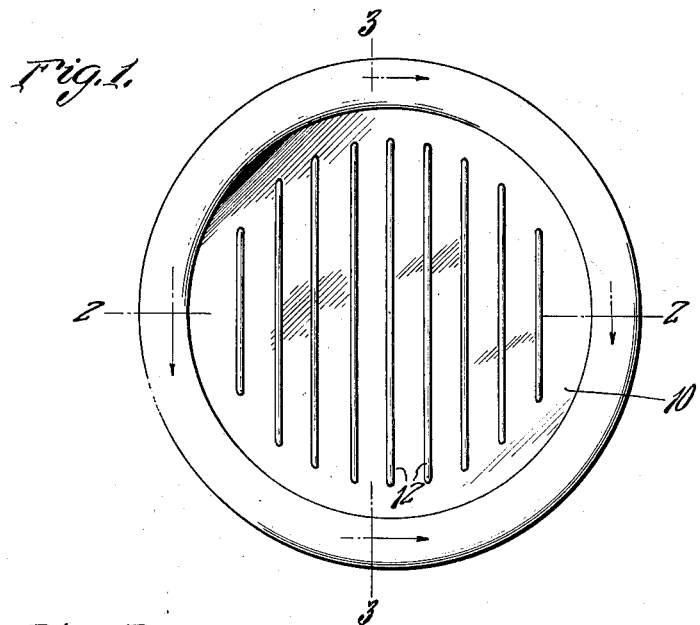
Figure 1 is a front elevation of a lens forming the subject matter of the present invention.

Referring to the drawing in detail, 10 indicates a lens of the character used in connection with automobile headlamps, and of course the lens can be constructed from any suitable material and vary in size without departing from the spirit of the invention.

Figure 2:
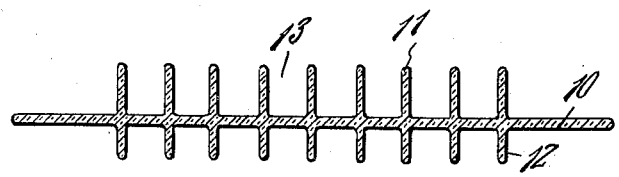
Figure 2 is a sectional view taken on line 2—2 of Figure 1.
Figure 3:
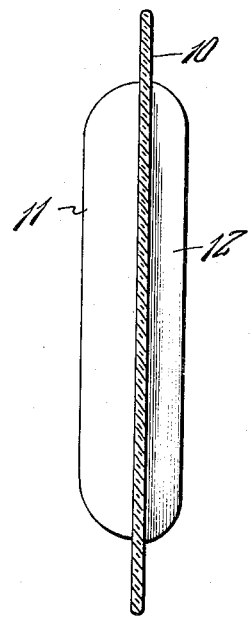
Figure 3 is a sectional view taken on line 3—3 of Figure 1.

In accordance with the present invention, this lens is formed at each side with spaced parallel plates, the plates projecting at right angles from the lens as shown in Figure 2.

The plates projecting from the inside of the lens are indicated at 11, while the plates projecting from the other side thereof are indicated at 12. It will be noted upon inspection of Figure 2 that the plates on one side are arranged directly in a line with the plates at the opposite sides inasmuch as the spaces between these plates define channels through which the light rays are directed in parallel planes for the purpose above enumerated. The plates 11 project from the inner side of the lens and are preferably longer than the plates 11 at the opposite sides, thus providing channels 13 of sufficient depth to direct the light rays through the lens in parallel planes without making the plates 12 on the outer side unnecessarily wide, and thereby minimizing the possibility of breaking the plates under any and all circumstances. It is of course to be understood that the plates 11 and 12 form an integral part of the lens and are adapted to be colored or suitably treated to prevent the light rays from passing through the plate, the plates being exclusively used to direct the light rays through the channels 13 in a manner and for a purpose above specified.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

A lens of the character described comprising a spaced series of parallel plates projecting from each side of the lens, the plates of the respective series being equidistantly spaced apart to define light passages therebetween, with the plates on one side of the lens disposed in alignment with the plates on the other side thereof, the plates on one side being considerably wider than the plates on the other side of the lens, and the plates of each series successively decreasing in length from the center of the lens towards the opposite sides thereof.

In testimony whereof I affix my signature.

STEVE J. BORCHARDT.